United States Patent [19]
Sasaki et al.

[11] 4,403,172
[45] Sep. 6, 1983

[54] VEHICLE INTERIOR LIGHT CONTROL SYSTEM

[75] Inventors: Ichiro Sasaki; Hirotoshi Namazue, both of Yokohama, Japan

[73] Assignees: Nissan Motor Co., Ltd., Yokohama; Kokusan Kinzoku Kogyo Kabushiki Kaisha, Tokyo, both of Japan

[21] Appl. No.: 228,566

[22] Filed: Jan. 26, 1981

[30] Foreign Application Priority Data

Feb. 27, 1980 [JP] Japan .................................. 55-22662

[51] Int. Cl.$^3$ ............................................. B60Q 7/00
[52] U.S. Cl. ....................................... 315/77; 315/84; 315/360
[58] Field of Search ........................... 315/77, 84, 360; 362/74

[56] References Cited
U.S. PATENT DOCUMENTS

| | | | |
|---|---|---|---|
| 3,389,296 | 6/1968 | Carruth | 315/77 |
| 4,071,805 | 1/1978 | Brock | 315/84 |
| 4,122,371 | 10/1978 | Talmage et al. | 315/84 |
| 4,339,696 | 7/1982 | Jabor | 315/360 |

OTHER PUBLICATIONS

"Delay System for Car Courtesy Lights" by Greg Swain Electronics (Australia), Jan. 1980, vol. 41, No. 10, pp. 40–43.

*Primary Examiner*—Harold A. Dixon
*Attorney, Agent, or Firm*—Fleit, Jacobson & Cohn

[57] ABSTRACT

A motor vehicle interior light control system wherein actuation of outside door handle does not cause the interior light to illuminate, but the interior light is illuminated for a predetermined period such as 10–50 seconds only after full return of the door handle from its once actuated position to its normal position, said operation control being accomplished by a CR-timer and a multi-stage transistor amplifier in combination.

4 Claims, 3 Drawing Figures

VEHICLE INTERIOR LIGHT CONTROL SYSTEM

BACKGROUND OF THE INVENTION

This invention relates to vehicle interior light control system by manipulation of the vehicle outside door handle. As is well known, such door handle is used for disengaging the door latch in advance of door opening from outside of the vehicle.

Such conventional interior light control system is so designed and arranged that when the outside door handle is actuated, these lights are turned on. Even when the door handle is returned from its actuated position to its normal resting position, the lights are turned on. They will remain on for a certain predetermined period such as ten seconds, whereupon the lights will turn off automatically. This kind of door handle-controled, interior lights control system provides the driver and passengers with substantial easiness and convenience in getting into the car. It assures also the driver and passenger(s) easy taking-out of baggages and the like from the interior when they leave the vehicle.

With such conventional door handle-operated interior light control system, further various advantages can be provided. As an example, the driver or the passengers can easily inspect from outside of the car whether various switches on the instrument board are turned on or off only by provisional manipulation of the door handle without opening the vehicle door. Such outdoor inspection is highly convenient to the driver or the passenger during dark parking period. Such convenience can also be enjoyed to inspect if there are any goods left in the passenger compartment without re-opening the vehicle door and only by a provisional door handle manipulation.

We have experienced in practice, however, that with use of the conventional type interior lights control system as above mentioned, unauthorized person operates the door handle to turn on the interior lights from outside for mischief and leaves it in the operated position by inserting a piece of stone, folded paper or fabric below the door handle proper for preventing it from its automatic return, in order to hold the lights on for an extended time. With such abnormal operation of the door handle, the car battery will run down.

SUMMARY OF THE INVENTION

It is therefore a main object of the present invention to provide a still further improved vehicle interior light control system of the door handle-operated type, capable of preventing a prematured car battery's power drain caused by leaving the interior light on because of mischief.

This and further advantages of the present invention will become more apparent upon reading the following detailed description thereof to be set forth and by way of substantially a preferred embodiment shown in the drawings.

For fulfilment of the objects of the present invention, it is now-proposed to provide an improved vehicle interior light control system, as comprising an outside door handle; a door handle switch; timer circuit responsive to the door handle switch being in its operated position; amplifier circuit for turning on the vehicle interior lights for a predetermined time period defined by the timer circuit upon the door handle being returned to its normal position.

DETAILED DESCRIPTION OF THE INVENTION

Figure 1:
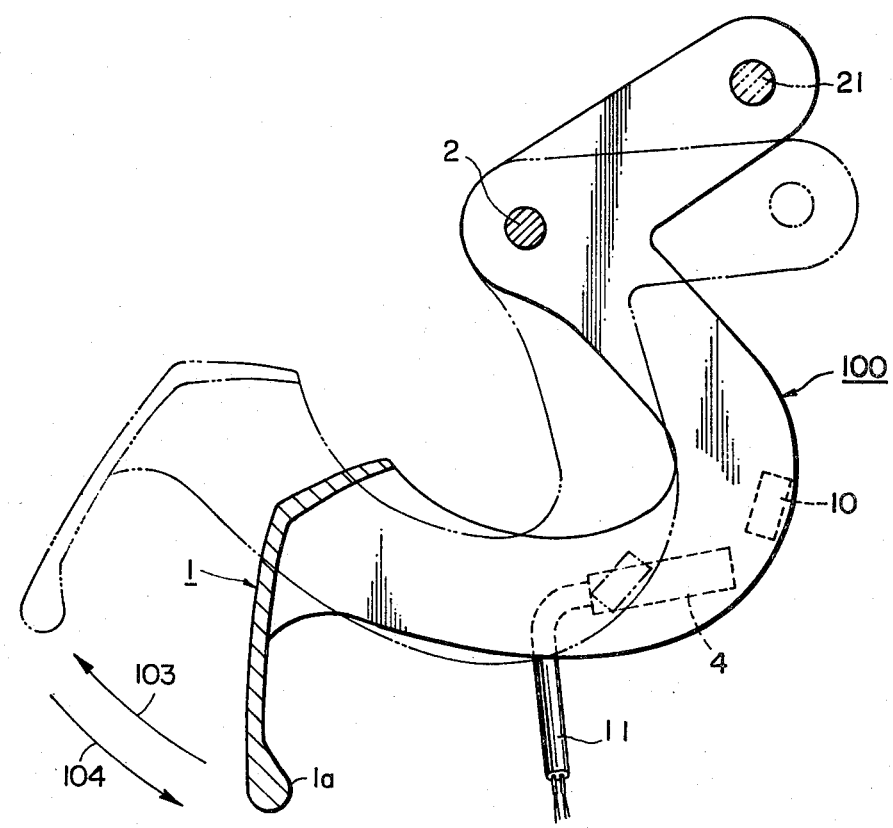
FIG. 1 is a sectional elevation view of a door handle embodying the present invention, taken along section line I-I' shown in FIG. 2.
Figure 2:
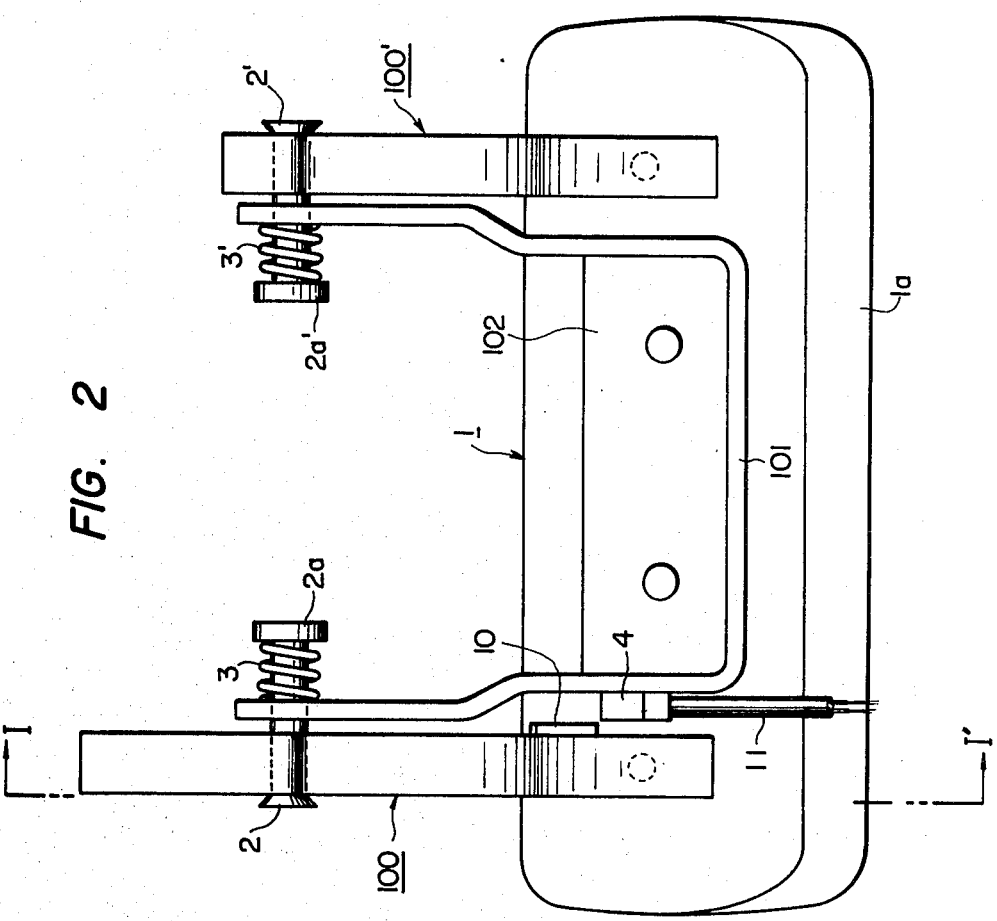
FIG. 2 is a rear view of the door handle, shown in FIG. 1.

Now referring to FIGS. 1 and 2, reference numeral 1 represents an outside door handle having a thickened outer edge portion 1a for easy hand manipulation thereof. A pair of arms 100 and 100' are fixedly attached at their root ends onto the handle 1 by conventional fixing means and at a properly selected mutual distance, as most clearly seen from FIG. 2.

A pair of aligned pivots 2 and 2' are studded through both arms 100 and 100' at positions selected near top ends thereof, respectively. These pivots 2 and 2' have respective enlarged heads 2a and 2a'.

A common and stationary yoke 101, generally of a channel shape when seen in FIG. 2, is rotatably related with said pivots 2 and 2' near the top ends of the yoke 101. A reinforcing plate 102 is fixedly attached to the yoke 101 as by welding or the like conventional fixing technique, so as to provide in combination a kind of bracket which is fixedly attached to a door panel of the vehicle, not shown. This fixed connection between the bracket and door panel is only hinged by a pair of pivots which are shown respective in cross-sections in FIG. 2.

A coil spring 3 is arranged between the enlarged head 2a of pivot pin 2 and the related part of yoke 101, as will be clearly seen from FIG. 2. In the similar manner, a coil spring 3' is mounted on the opposite pivot pin 2'. The mode of attachment of these coil springs 3 and 3' is such that by turning the handle clockwise in FIG. 1 to its door unlatch position shown in chain-dotted lines, these coil springs 3 and 3' are energized, while, on the other hand, when the door handle is released it will be returned automatically to its normal resting position shown in full lines in FIG. 1 by releasing the manually stored energy in the coil springs 3 and 3'. These springs 3 and 3' constitute, thus, return springs for the door handle 1. Such spring-loaded, self-returning arrangement of the outside door handle is highly conventional and thus, its details have been omitted from the drawings and specification.

This manipulating rotational range of the door handle is shown by an arrow 103, while the automatic return rotational range is shown by an opposite arrow 104 in FIG. 1, respectively.

Figure 3:
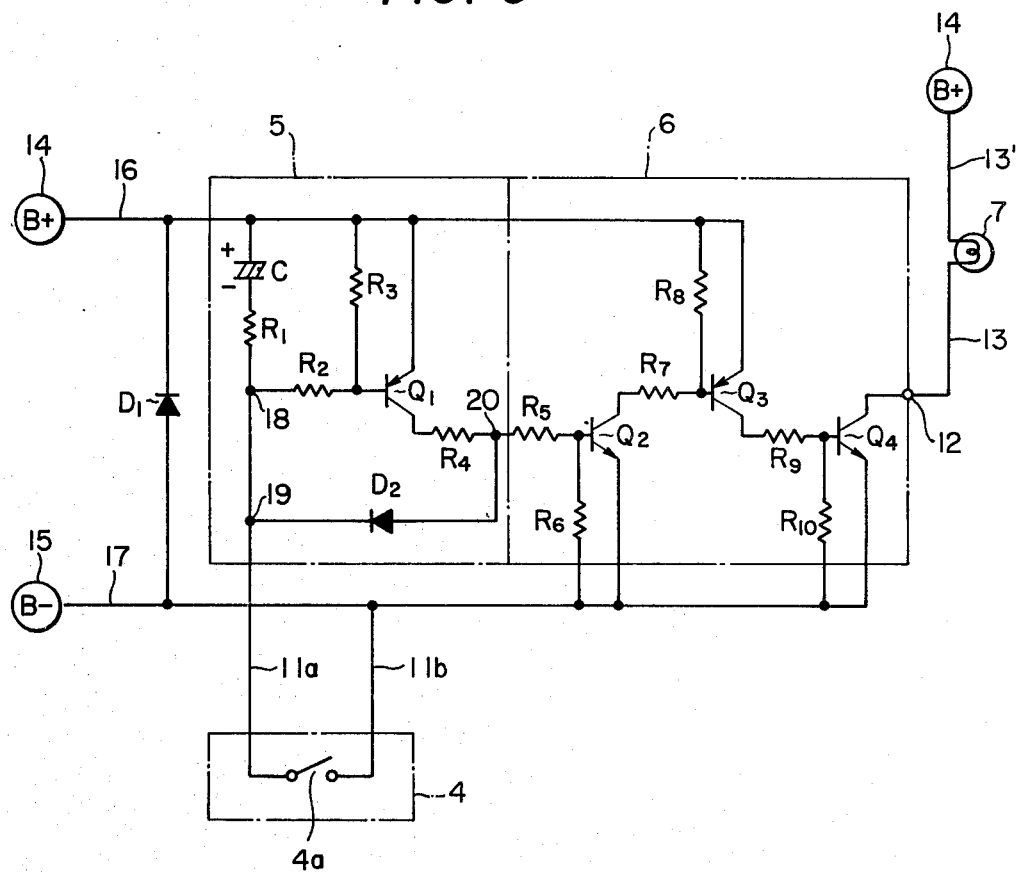
FIG. 3 is a schematic electrical diagram of the control circuit employed in this invention.

Numeral 4 represents a switching unit mounted fixedly on the yoke 101, an electric chord 11 comprising electric leads 11a and 11b and extending from the said unit towards the electronic circuit shown in FIG. 3.

On the arm 100, there is provided fixedly a small permanent magnet piece 10. The relative positioning of magnetic piece 10 and switching unit 4 is so selected and arranged that the switching elements 4a (FIG. 3) of the unit 4 are brought into "on"-position when the door handle 1 has been partially rotated from the full line to chain-dotted line position and the switching elements 4a magnetically come to their closed position. Thus, the switch proper 4a is a kind of a magnet switch. Naturally, the positioning of the magnet and the cooperating switch unit can be interchanged between the yoke and the handle into the reversed relationship. Further, the magnet switch 4 can be replaced by a purely mechanically operating microswitch, if necessary.

Now referring to FIG. 3, the switch elements 4a, comprising a switching arm and a stationary contact cooperable therewith, are connected through leads 11a and 11b to CR-timer circuit 5 and amplifier circuit 6.

The timer circuit 5 comprises condenser C; resistors $R_1$; $R_2$ and $R_3$; transistor $Q_1$, further resistor $R_4$ and diode $D_2$ which are connected into a specific timer circuit as shown.

Amplifier circuit 6 comprises transistors $Q_2$; $Q_3$ and $Q_4$ and several resistors $R_5$; $R_6$; $R_7$; $R_8$; $R_9$ and $R_{10}$ which are connected mutually as shown, so as to constitute a specific amplifier circuit.

The final stage transistor $Q_4$ is connected through output terminal 12 and lead 13 to a vehicle interior light 7 which is then further connected through lead 13' of positive pole 14 of the car battery, not specifically shown. The positive and negative poles are only schematically shown, at "B-plus" and "B-minus", respectively. Although a plurality of vehicle interior lights are provided, only one representative thereof is shown only schematically by a single lamp 7.

The positive and negative poles 14 and 15 of the car battery are connected through respective main lines 16 and 17 to the both circuits 5 and 6 for energization thereof. The switch elements 4a are connected more specifically through leads 11a and 11b to the positive and negative main lines 16 and 17, the latter 17 being connected through final stage transistor $Q_4$ and the lead 13 to the interior light 7 which is further connected through the lead 13' to the positive pole 14.

One end of the charge and discharge condenser C is connected to positive line 16, while the opposite end of the condenser is connected through resistor $R_1$ to lead 11a. This connection route includes two junctions 18 and 19 in succession. The first junction 18 is connected through resistor $R_2$ to the base of transistor $Q_1$, the emitter of the transistor $Q_1$ being connected with positive line 16 and the collector leading through resistor $R_4$ to junction 20. Between both junctions 19 and 20, second diode $D_2$ is inserted. In this way, the CR timer circuit 5 is constructed.

Now referring to the amplifier 6, resistor $R_5$ is inserted between junction 20 and base of first amplifier transistor $Q_2$; a resistor $R_6$ being inserted between the base of the transistor $Q_2$ and negative line 17. Emitter of transistor $Q_2$ is connected to negative line 17, while the collector is connected through resistor $R_7$ to the base of second amplifier transistor $Q_3$, the emitter thereof being connected to positive line 16. A resistor $R_8$ is inserted between the base of the transistor $Q_3$ and positive line 16. On the other hand, the collector of transistor $Q_3$ is connected through resistor $R_9$ to the base of third amplifier transistor $Q_4$, the emitter of the transistor $Q_4$ being connected to negative line 17. A resistor $R_{10}$ is connected between the base of the transistor $Q_4$ and negative line 17. The collector of the transistor $Q_4$ is connected through terminal 12 and lead 13 to the interior lamp 7, as was already mentioned.

As may be well supposed from the foregoing, respective resistors $R_3$; $R_6$; $R_8$ and $R_{10}$ connected as base bias resistors to the transistors $Q_1$; $Q_2$; $Q_3$ and $Q_4$ act as respective operation stabilizers thereof. First diode $D_1$ acts as a kind of surge current absorber for protecting related various electronic circuit components from the ill influence of such occasional surges.

With the door handle 1 positioned at its normal resting position, shown in full lines in FIG. 1, the switch elements 4a of handle switch 4 are kept at its open position.

In operation, with the door handle kept at its normal and resting position, no voltage difference will appear across the condenser C, resulting in all the transistors $Q_1$–$Q_4$ made unconductive, thus the interior light 7 remains off.

With the door handle 1 lifted or the button depressed, cooperable switch elements 4a are closed and current will flow from positive line 16 through capacitor C and resistor $R_1$; junctions 18 and 19; closed switch elements 4a and lead 11b to negative line 17, thus the condenser C is charged almost instantly. At the same time, current is fed to the base of the transistor $Q_1$ and such conducting state thereof will be maintained so far as the switch elements 4a are held to close. During this conducting hold of transistor $Q_1$, current will continue to flow from positive line 16 through transistor $Q_1$, resistor $R_4$, junction 20, diode $D_2$; junction 19, lead 11a, closed switch elements 4a and lead 11b to negative line 17.

Even when switch elements 4a are held in its off-position, current could flow from the side of junctions 18; 19 towards transistor $Q_2$. Diode $D_2$ has been inserted as shown in FIG. 3, for the prevention of possible current flow from junctions 18, 19 and 20 in this direction towards transistor $Q_2$. That is, if there be no provision of this diode $D_2$ and current flow in this direction should occur, transistor $Q_2$ would become conductive in this instance so that the interior lamps(s) 7 could be ignited. Therefore, in this manner, a current feed through resistor $R_5$ to the base of transistor $Q_2$ will be prevented, thus all the transistors $Q_2$; $Q_3$ and $Q_4$ contained in the amplifier circuit 6 will be held in their non-conducting state. Therefore, the interior light 7 will not be illuminated when the door handle is lifted or the door button is depressed.

Next, the operation mode upon returning of the door handle to its normal and resting position will be set forth. With this door handle return, switch elements 4a are opened and the accumulated electric charge at the condenser C will be discharged through resistors $R_1$ and $R_2$ and transistor $Q_1$ which is thus conductive until termination of the condenser discharge. With current conduction of transistor $Q_1$ by the current discharge from condenser C, current will flow from positive line 16, resistors $R_4$ and $R_5$ and transistor $Q_2$ to negative line 17. With this current conduction through this transistor $Q_2$, next succeeding transistors $Q_3$ and $Q_4$ will become conductive. With current conduction through the final stage transistor $Q_4$, current will flow through the interior light 7 to illuminate it.

After the condenser C is discharged, the transistor $Q_1$ is no longer conductive, subsquently, the transistors $Q_2$, $Q_3$ and $Q_4$ are turned off in succession. When the transistor $Q_4$ is turned off, it no longer conducts current flow from positive pole 14 through the interior light 7.

As a preferred embodiment, the amplifier circuit 6 has been designed and arranged as a three stage transistor amplifier comprising three successive transistors $Q_2$, $Q_3$ and $Q_4$. However, the number of amplifier stages may be increased or decreased in accordance with power requirement at the interior light or lights as at 7.

Although in the foregoing the transistor amplifier circuit 6 is controled to on or off by the output of CR-timer circuit 5. However, the arrangement may be so modified that a switching element such as thyristor is on-off controled by the output of the circuit 5, although not specifically illustrated in the drawings, since such modification will easily occur to any skilled person in the art upon reading the foregoing description so far set forth. Equally, the CR-timer may be replaced by a so-called digital timer, electric timer or even by a mechanical timer. Still equally, the magnetic switch may be replaced by a normal mechanically operated microswitch. Also, the interior lights 7 may be replaced by or combined with a door lock light exteriorly mounted for providing illumination of the door lock key slot to facilitate key insertion during darkness. Further, the present interior lighting control may be combined with conventional door jam switching system.

What is claimed is:
1. A vehicle light control system, comprising
an outside door handle for manually opening and closing the vehicle door,
a door handle switch operable by said door handle operation in accordance with normal position of said door handle and operated position thereof,
timer circuit responsive to said door handle switch being closed in its operated position of said door handle
means for turning on the vehicle light for a predetermined time period defined by said timer circuit upon the door handle switch being returned to be off in its normal position of said door handle.

2. The vehicle light control system of claim 1 wherein the vehicle light comprises an interior passenger compartment lamp.

3. In a vehicle having a door movable between a closed and an open position and a door opening mechanism operable to latch and unlatch the door and further having an electrical power source and a lighting system of the type including an interior passenger compartment lamp, the improvement comprising:
switch means operable by said door opening mechanism into first and second operating modes in accordance with normal position of said door opening mechanism and operated position thereof respectively,
timer circuit responsive to said switch means being in its second operating mode,
means for energizing the interior lamp for a predetermined time period defined by said timer circuit upon said switch means being returned to its first operating mode.

4. The improved vehicle interior lighting system of claim 3 wherein said timer circuit comprises a CR-timer, and said energizing means comprises multi-stage transistor amplifier.

* * * * *